US007093796B2

(12) United States Patent
Chak

(10) Patent No.: US 7,093,796 B2
(45) Date of Patent: Aug. 22, 2006

(54) AIRCRAFT

(76) Inventor: Mark Chak, 3250 Coney Island Ave., Apt E2, Brooklyn, NY (US) 11235

( * ) Notice: Subject to any disclaimer, the term of this patent is extended or adjusted under 35 U.S.C. 154(b) by 237 days.

(21) Appl. No.: 10/731,330

(22) Filed: Dec. 10, 2003

(65) Prior Publication Data

US 2004/0113018 A1 Jun. 17, 2004

Related U.S. Application Data

(63) Continuation-in-part of application No. 10/054,191, filed on Jan. 24, 2002, now abandoned.

(51) Int. Cl.
*B64C 25/52* (2006.01)
(52) U.S. Cl. .................. 244/108; 244/102 R
(58) Field of Classification Search ............ 244/100 A, 244/100 R, 102 R, 108, 139, 1 R, 121, 159.2, 244/172.6
See application file for complete search history.

(56) References Cited

U.S. PATENT DOCUMENTS

| 2,837,303 | A | * | 6/1958 | De Van Guy | ................ 244/105 |
| 2,844,339 | A | * | 7/1958 | Stroukoff | ................. 244/102 R |
| 3,070,327 | A | * | 12/1962 | Dornier et al. | ............ 244/12.1 |
| 3,387,802 | A | * | 6/1968 | Cruz | ...................... 244/102 R |
| 4,558,837 | A | * | 12/1985 | Mens et al. | ................. 244/108 |
| 4,697,762 | A | * | 10/1987 | Arney | ........................ 244/101 |
| 5,259,574 | A | * | 11/1993 | Carrot | .................... 244/100 A |

FOREIGN PATENT DOCUMENTS

WO         WO 9413531 A1  *  6/1994

* cited by examiner

*Primary Examiner*—Peter M. Poon
*Assistant Examiner*—Timothy D. Collins
(74) *Attorney, Agent, or Firm*—I. Zborovsky

(57) ABSTRACT

An aircraft has an aircraft part with driving means and a body, and an impact reducing device which is movable between an inoperative position in which it is located close to the body and an operative position in which it is moved away from the body so as to first be subjected to impact against the ground and to dampen the impact, wherein the impact reducing device is formed as a plate-shaped element extending in a longitudinal direction of the body in a direction from a rear end to a front end, the plate-shaped element being pivotally connected with the aircraft body at one end so that it can pivot about a substantially horizontal axis and the other end of the plate-shaped element in the inoperative position is located near the aircraft body, while in the operative position it moved away from the aircraft body.

8 Claims, 2 Drawing Sheets

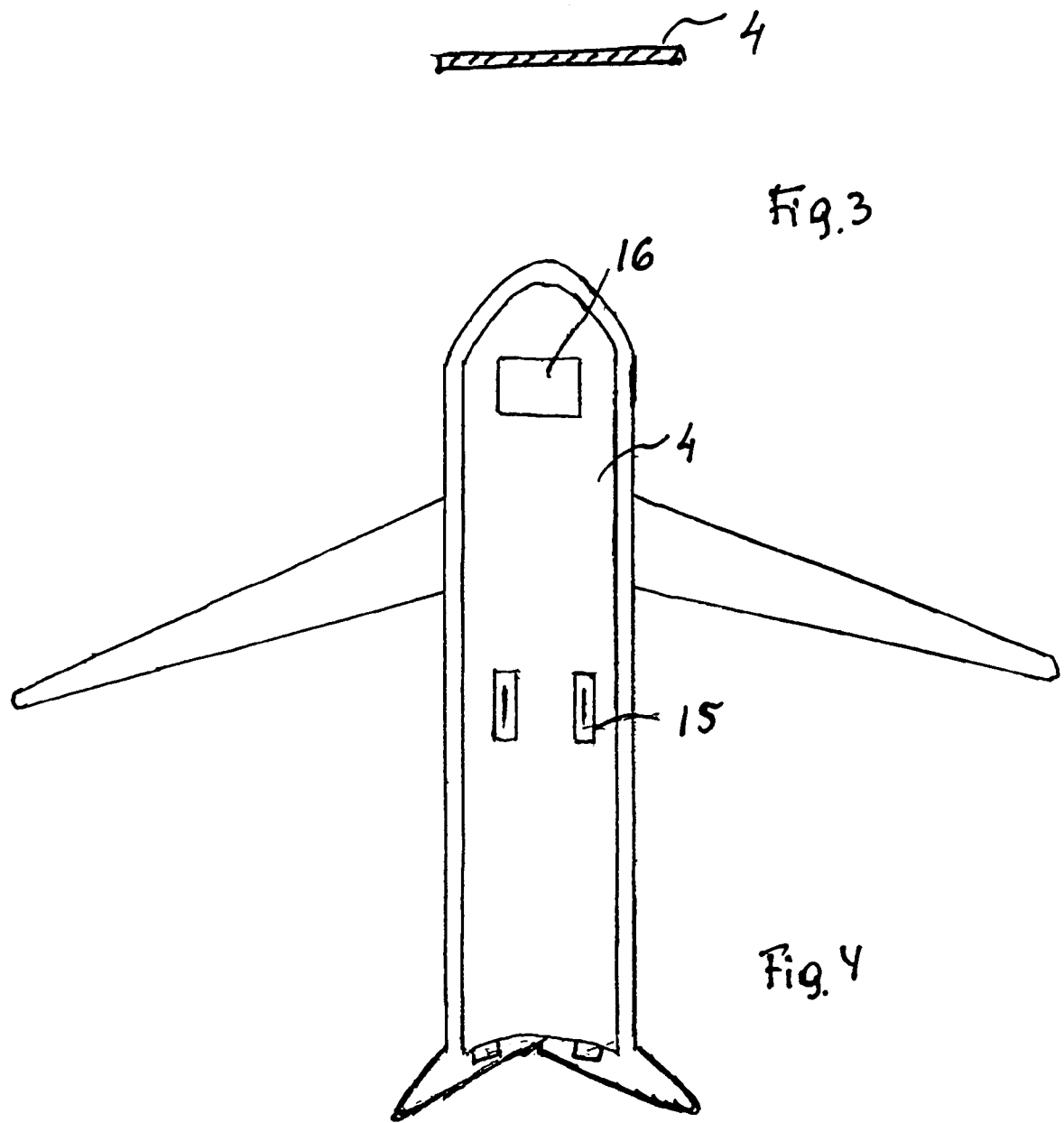

AIRCRAFT

CROSS-REFERENCE TO A RELATED APPLICATION

This application is a continuation-in-part application of Ser. No. 10/054,191 filed Jan. 24, 2002 now abandoned.

BACKGROUND OF THE INVENTION

The present invention relates to an aircraft with means for at least reducing impact against the ground.

It is known that aircrafts are prone to accidents, in which case the aircraft falls on the ground and is destroyed with subsequent death of aircraft occupants. It is therefore believed to be important to develop means for at least reducing the impact of the aircraft against the ground so as to save human lives.

SUMMARY OF THE INVENTION

Accordingly, it is an object of the present invention to provide an aircraft which has better chances for reducing impact against the ground and therefore saves human lives.

In keeping with these objects and with others which will become apparent hereinafter, one feature of the present invention resides, briefly stated, in an aircraft which has an aircraft part with driving means and a body; and an impact reducing device which is movable between an inoperative position in which it is located close to the body and an operative position in which it is moved out of the body so as to first be subjected to impact against the ground and to dampen the impact, wherein the impact reducing device is formed as a plate-shaped sliding surface extending in a longitudinal direction of said body in a direction from a rear end to a front end, said plate-shaped element being pivotally connected with said aircraft body at one end so that it can pivot about a substantially horizontal axis and the other end of said plad shaped element in the inoperative position is located near the aircraft body, while in the operative position it moves away from the aircraft body.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a cross-section of a plate-shaped impact-reducing element; and

FIG. 4 shows a bottom view of the aircraft.

DESCRIPTION OF THE PREFERRED EMBODIMENTS

Figure 1:
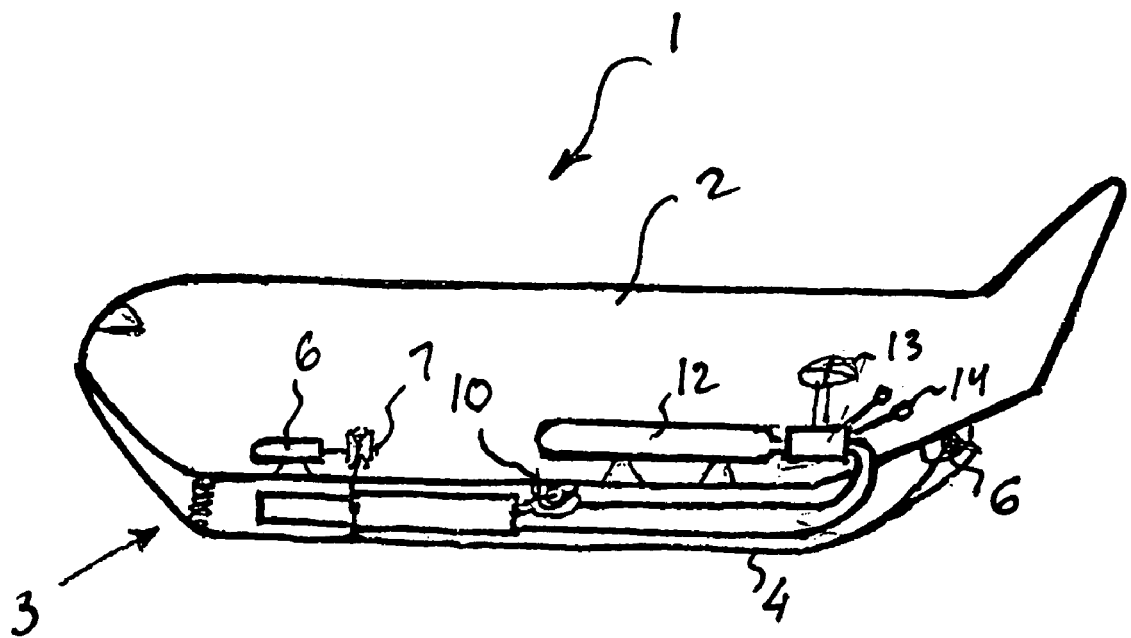
FIGS. 1 and 2 are views showing an aircraft in accordance with the present invention respectively in an inoperative position and in an operative position.

An aircraft in accordance with the present invention has an aircraft part which is identified as a whole with reference numeral 1. The aircraft part 1 has an aircraft body 2 and not shown drive means. The aircraft further has means for at least reducing the impact of the aircraft against the ground in the event of an accident, such as a crash etc, as identified with reference numeral 3. The impact reducing means include first of all a plate-shaped element 4 which extends substantially in a longitudinal direction of the aircraft body 2 from a rear end toward a front end. In one of the ends, for example at the rear end, the plate-shaped member 4 is pivotally connected with the aircraft body 2. For this purpose the rear end of the plate-shaped member 4 can be provided with a lug 5 having an opening 6, while the aircraft body can be provided with a pin 7 extending through the opening 6, so that the plate-shaped member 4 can freely turn around a horizontal axis of the pin 6 and opening 7 between an inoperative shown in FIG. 2 to an operative position shown in FIG. 2. In the inoperative position shown in FIG. 1, the plate-shaped member 4 is located underneath and very close to the airplane body 2, while in the operative position it is inclined relative to the airplane body, in particular the opposite end of the plate-shaped member 4 is located far from the airplane body so as to form a sliding and resisting surface to dampen the impact of the aircraft against the ground.

A spring means 5 formed for example as two springs spaced transversely from one another, push the opposite end of the plate-shaped member 4 from the inoperative position to the operative position. A motor 6 drives a pulley 7 on which a cable 8 is located. The cable is connected with an area close to the opposite end of the plate-shaped member 4. When the motor 6 rotates the pulley 7 the cable 8 is wound on the pulley 7 and pulls the plate-shaped member 4 from the operative position shown in FIG. 2 into the inoperative position shown in FIG. 1. When it is necessary to move the plate-shaped member 4 from the inoperative position shown in FIG. 1 to the operative position shown in FIG. 2, the spring 5 expands and pushes the plate-shaped member 4 to the operative position, the motor 6 easily rotates the pulley 7 so as to unwind the cable 8 or just allows the pulley to rotate free, for example by using a corresponding coupling.

The device for reducing an impact further has shock absorbing means formed for example as shock absorbers 9. One end of the shock absorbers 9, for example the piston rod can be connected pivotally to the aircraft body 2 by pivot means 10, while the opposite end, for example the cylinder is connected to the plate-shaped member 4 also pivotally. In the inoperative position shown in FIG. 1, the shock absorbers are turned and extend substantially horizontally, while in the operative position shown in FIG. 2 they turn so as to extend transversely to the aircraft body to be located between the aircraft body and the plate-shaped element 4 so as to resist the movement from the position shown in FIG. 2 to the position shown in FIG. 1 during impact of the aircraft against the ground.

The impact reducing means further include an inflatable cushion 11 located between the aircraft body 2 and the plate-shaped element 4. An air container 12 provided with a faucet 13 and manometers 14 supplies air into the air cushion 11 for inflating the air cushion so that the air cushion expands between the plate-shaped element 4 and the aircraft body. The shock absorbers 9 and the air cushion 11 in the operative position are located between the plate-shaped element 4 and an aircraft body 2 and resist the displacement of the plate-shaped element 4 from the operative position to the inoperative position, and therefore dampen an impact of the aircraft body against the ground.

Figure 2:
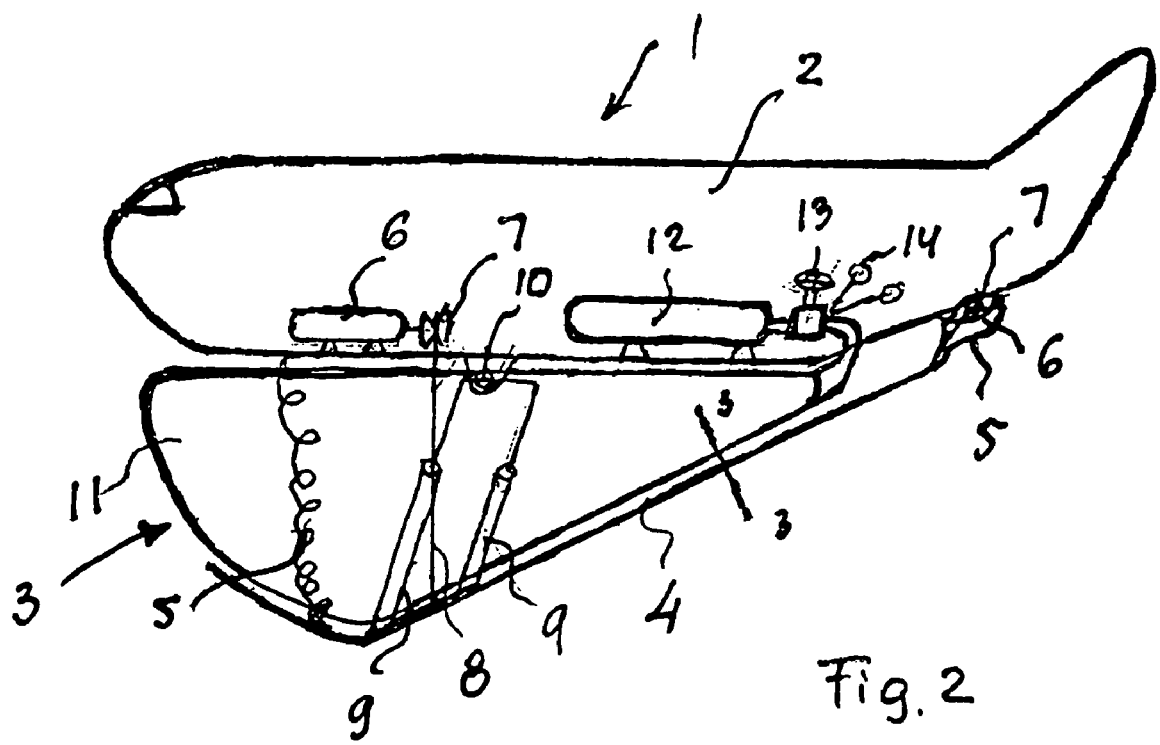

The inoperative position and the operative position of the aircraft are shown in FIGS. 1 and 2. FIG. 3 shows a bottom of the aircraft with the plate-shaped element 4 provided with throughgoing openings for aircraft wheels 15 and a throughgoing opening 16 for exposing a luggage compartment.

It is believed that the operation of the aircraft in accordance with the present invention is clear.

In the event of a high probability of an accident, the electric motor 6 and the gas container 12 are activated, the springs 5 push the plate-shaped element 4 to the operative position shown in FIG. 2, the cushion 11 is inflated by gas supplied from the container 12, the motor 6 allows the cable 8 to unwind so that the opposite end of the plate-shaped element 4 moves away from the body, and the shock absorbers 9 are turned to assume the position between the aircraft body of the plate-shaped element 4. In the event of the impact the shock absorbers 9 and the cushion 11 hold the plate-shaped member 4 in the operative position, thus substantially dampening the impact of the aircraft against the body.

There can be one spring 5, one pair of the shock absorbers 9, and one cable 8 located at one side of the air cushion 11. However, it is advisable to have 2 springs 5, 2 pairs of the shock absorbers 9, and 2 cables 8 located at both lateral sides of the air cushion 11 as considered in a transverse direction.

It will be understood that each of the elements described above, or two or more together, may also find a useful application in other types of constructions differing from the types described above.

While the invention has been illustrated and described as embodied in aircraft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An aircraft, comprising an aircraft part with driving means and a body; and an impact reducing device which is movable between an inoperative position in which it is located close to the body and an operative position in which it is moved away from the body so as to first be subjected to impact against the ground and to dampen the impact, wherein the impact reducing device is formed as a plate-shaped element extending in a longitudinal direction of said body in a direction from a rear end to a front end, said plate-shaped element being pivotally connected directly with said aircraft body at one end of said body so that it can pivot about a substantially horizontal axis and the other end of said plate-shaped element in the inoperative position is located near the aircraft body, while for the operative position the other end of said plate-shaped element is pivoted away from the aircraft body.

2. An aircraft as defined in claim 1; and further comprising pivot means for pivotally connecting said one end of said plate-shaped element with said body for pivoting about said substantially horizontal axis.

3. An aircraft, comprising an aircraft part with driving means and a body; and an impact reducing device which is movable between an inoperative position in which it is located close to the body and an operative position in which it is moved away from the body so as to first be subjected to impact against the ground and to dampen the impact, wherein the impact reducing device is formed as a plate-shaped element extending in a longitudinal direction of said body in a direction from a rear end to a front end, said plate-shaped element being pivotally connected with said aircraft body at one end so that it can pivot about a substantially horizontal axis and the other end of said plate-shaped element in the inoperative position is located near the aircraft body, while in the operative position it is moved away from the aircraft body; and spring means for pushing said other end of said plate-shaped element away from said aircraft body.

4. An aircraft, comprising an aircraft part with driving means and a body; and an impact reducing device which is movable between an inoperative position in which it is located close to the body and an operative position in which it is moved away from the body so as to first be subjected to impact against the ground and to dampen the impact, wherein the impact reducing device is formed as a plate-shaped element extending in a longitudinal direction of said body in a direction from a rear end to a front end, said plate-shaped element being pivotally connected with said aircraft body at one end so that it can pivot about a substantially horizontal axis and the other end of said plate-shaped element in the inoperative position is located near the aircraft body, while in the operative position it is moved away from the aircraft body; and shock absorbers located between said aircraft body and said plate-shaped element and movable from a position in which they extend substantially horizontally in the inoperative position and a position in which they extend substantially transversely to and downwardly from said aircraft body in said operative position.

5. An aircraft as defined in claim 4, wherein said shock absorbers are pivotable between said positions about a substantially horizontal axis.

6. An aircraft as defined in claim 1; and further comprising motor means with pulley means and cable means arranged so that the cable means are connected with said plate-shaped element and in response to operation of said motor means and turning of said pulley means, said cable means pull the other end of said plate shaped element toward said aircraft body.

7. An aircraft as defined in claim 2; and further comprising air cushion means, and means for inflating said air cushion means.

8. An aircraft as defined in claim 7, wherein said cushion means is located between said plate-shaped element and said aircraft body and is inflatable so that in the operative position it is inflated and occupies a space between the aircraft body and said plate-shaped element.

* * * * *